United States Patent [19]

Ando

[11] Patent Number: 5,673,126
[45] Date of Patent: Sep. 30, 1997

[54] IMAGE READING DEVICE WITH STARTING POSITION SETTING SYSTEM

[75] Inventor: Motonobu Ando, Iwakura, Japan

[73] Assignee: Brother Kogyo Kabushiki Kaisha, Aichi-ken, Japan

[21] Appl. No.: 656,605

[22] Filed: May 31, 1996

[30] Foreign Application Priority Data

Jun. 1, 1995 [JP] Japan .................. 7-135111

[51] Int. Cl.$^6$ .................. H04N 1/04; H04N 1/40; H04N 1/38
[52] U.S. Cl. .................. 358/498; 358/461; 358/474; 358/488
[58] Field of Search .................. 358/498, 461, 358/496, 494, 474, 488, 464

[56] References Cited

U.S. PATENT DOCUMENTS

| | | | |
|---|---|---|---|
| 4,882,631 | 11/1989 | Mine et al. | 358/471 |
| 5,107,350 | 4/1992 | Omori | 358/461 |
| 5,125,047 | 6/1992 | Ito et al. | 382/321 |
| 5,168,377 | 12/1992 | Nagano | 358/471 |
| 5,371,613 | 12/1994 | Arimoto et al. | 358/461 |

Primary Examiner—Kim Vu
Assistant Examiner—Tia M. Harris
Attorney, Agent, or Firm—Kane, Dalsimer, Sullivan, Kurucz, Levy, Eisele and Richard, LLP

[57] ABSTRACT

A distance between an original sensor and an image sensor is determined by counting a number of pulses of a stepping motor driving an original feeder as an original travels between the original sensor and the image sensor. A pair of markings on a white level reference member opposing the image sensor are used to determine the reading range of the image sensor, and further, when the original travelling past the image sensor obscures the markings, the obscuring of the markings is sensed by a controller and used to determine the above-mentioned distance. A starting position for the image sensor to begin sensing an image borne by an original is set by the controller based upon the distance, and the starting position is recorded in an EEPROM such that it can be recalled between uses of the device.

10 Claims, 6 Drawing Sheets

IMAGE READING DEVICE WITH STARTING POSITION SETTING SYSTEM

BACKGROUND OF THE INVENTION

The present invention relates to an image reading device used in a facsimile device, copier, or the like.

Conventionally, a facsimile device includes an image reading device for reading an image printed on an original. An "original" is a document, drawing, or other sheet bearing an image to be read. The image is transmitted to another facsimile device via a modem, a network control unit (NCU), and a telephone line.

A feeding device in the image reading device feeds an original, a light source illuminates the original, and an image sensor (such as a CCD) reads the reflected light.

In order to provide a threshold for discriminating an image pattern from the background (usually white), the image reading device often includes a white level reference member facing the image sensor across the feed path of the originals. The white level reference member is readable when no original is present in the feed path. After the facsimile device is turned on, the image sensor reads the white surface of the white level reference member and the threshold (white level) is stored.

Conventionally, an original detecting sensor is provided upstream of the image sensor. The starting position for reading an original is determined by driving a stepping motor of the feeding device by predetermined number of pulses after the original is detected by the original detecting sensor.

However, because of variation in the sensitivity of the original detecting sensor, or mounting error of the original detecting sensor, the starting position for reading an original has variation between machines. That is, the starting timing for reading an original is different for every individual machine. The variations can lead to a faulty reading of images formed close to the top portion of an original. The same problem exists in a copier, an image scanner or a digitizer.

SUMMARY OF THE INVENTION

It is therefore an object of the present invention to provide an improved image reading device which can correctly set a starting position for reading originals.

In order to meet the object of the invention, an image reading device includes: an original feeder for feeding an original along a feeding path; an image sensor for reading images from the original, the image sensor being downstream along the feeding path of the original feeder; a white level reference member, facing the image sensor from across the feeding path; at least one marking formed on the white level reference member facing the image sensor; an original sensor provided downstream of the original feeder and upstream of the image sensor in the feeding direction; a first memory for recording a feeding amount as the original is fed by the original feeder along the feeding path, after the original sensor detects the original and until the marking or markings are obscured by the original; control means for determining a starting position of the original along the feeding path for the image sensor to begin reading the images.

In this manner, the starting position can be determined irrespective of any mounting error of any portions of the feeding or sensing mechanisms, and the starting position is therefore the same for every manufactured machine when such calibration is performed. That is, the starting position may correspond to a feeding distance from the original sensor to the image sensor for that particular machine, or to a summation of a feeding distance from the original sensor to the image sensor and a non-printing area of the original. Advantageously, the markings are used both for setting the reading range of the image sensor and for determining the starting position for the image sensor to begin reading an image.

Preferably, the image reading device further includes a second memory for retaining the starting position. The second memory is preferably a non-volatile memory that retains the starting position when no power is supplied to the image reading device. Accordingly, the calibration, i.e., the determination of the starting position, only needs to be performed once, then the proper starting position is stored and recallable each time the device is powered up.

In one particular development of this aspect of the invention, the original feeder includes a stepping motor for driving the original feeder. The image reading device further includes: means for counting pulses of the stepping motor as the original is fed by the original feeder along the feeding path, after the original sensor detects the original and until the at least one marking is obscured by the original.

Accordingly, the starting position is recorded as a number of feeding pulses from when the original sensor senses the original until the image sensor senses the original (i.e., the markings are obscured).

According to another aspect of the invention, an image reading device includes: an original feeder for feeding an original along a feeding path; a lower guide plate having an opening formed therein; an upper member across the feeding path from the lower guide plate; a line image sensor for reading images from the original, the line image sensor being downstream along the feeding path of the original feeder and attached to the lower guide plate, and the line image sensor positioned to read images through the opening; a white level reference member attached to the upper member in a position readable by the line image sensor and facing the image sensor from across the feeding path; a pair of markings on the white level reference member in a position readable by the line image sensor, the pair of markings being separated from each other by a predetermined distance; an original sensor provided downstream of the original feeder and upstream of the line image sensor along the feeding path; a first memory for recording a feeding amount as the original is fed by the original feeder along the feeding path, after the original sensor detects the original and until the pair of markings are obscured by the original; and a controller. The controller includes: means for determining a reading range of the line image sensor when the line image sensor reads the predetermined distance from the pair of markings; and means for determining a threshold level of the image sensor when the line image sensor reads the white level reference member; and means for determining a starting position of the original along the feeding path for the line image sensor to begin reading the images.

DETAILED DESCRIPTION OF THE PREFERRED EMBODIMENTS

Figure 1:
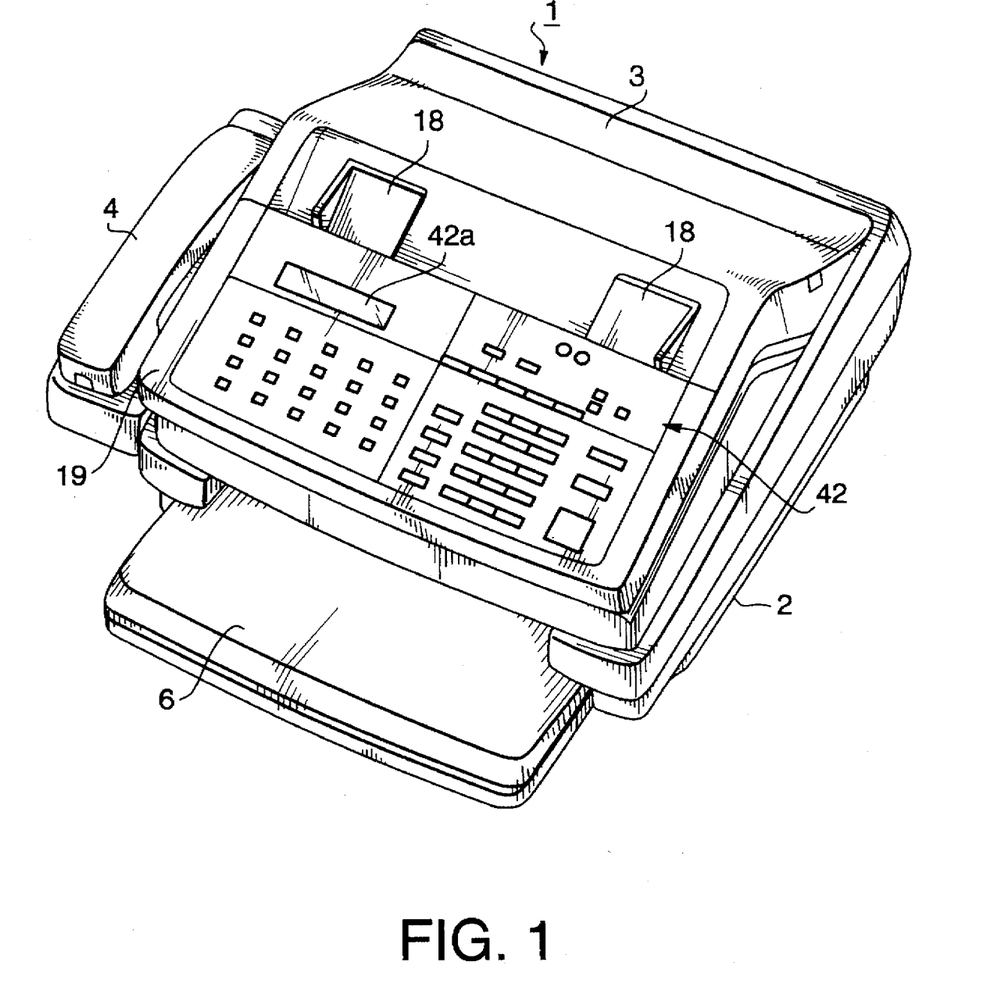
FIG. 1 is a perspective view of a facsimile device employing an embodiment of an image reading device according to the invention.
Figure 2:
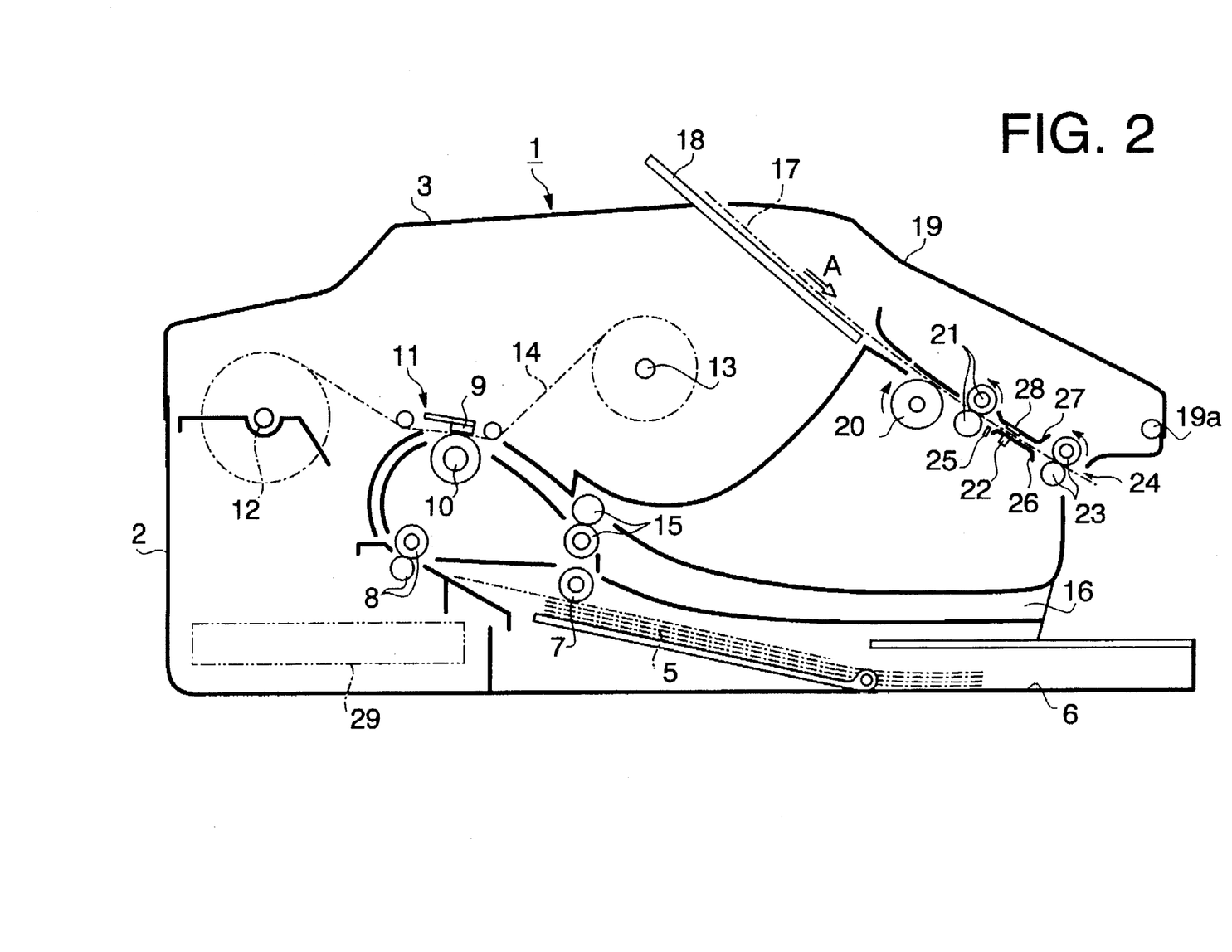
FIG. 2 is a schematic side view of the facsimile of FIG. 1.

FIG. 1 is a perspective view of a facsimile device 1 to which the embodiment of the invention is applied, and FIG. 2 is a schematic side view of the facsimile device 1.

As shown in FIG. 1, the body of the facsimile device includes a lower cover 2 and an upper cover 3. A handset 4 is provided at one side of the lower cover 2. A recording sheet cassette 6 is attachable to and detachable from the lower case 2. An original holder 18 accepts originals to be read. A movable cover 19, having an operation panel 42 with a display 42a, is rotatably supported on the upper cover 3.

As shown in FIG. 2, a number of recording sheets 5 are stacked in the recording sheet cassette 6. A single recording sheet 5 is fed by a sheet feeding roller 7 from the stack to a pair of intermediate feeding rollers 8, which feed the sheet 5 to a printing unit 11 including a thermal line printhead 9 and a platen roller 10.

When the recording sheet 5 reaches the printing unit 11, the intermediate feeding rollers 8 wait until the facsimile device 1 receives image data from another facsimile device, and then feed the recording sheet 5 in tandem with the platen roller 10. When the facsimile device 1 receives the image data, the image is reproduced on the waiting recording paper 5 via an ink sheet 14 (fed from a feeding reel 12 and wound by a winding reel 13). The recording sheet 5 on which the image is formed is discharged through an original discharge slot 16 by a pair of discharge rollers 15.

One or more original 17 are placed on the original holder 18, inclined downward to the front side of the facsimile device 1. The movable cover 19 is swingably supported about a shaft 19a provided to the front side of the upper cover 3. The original 17 placed on the original holder 18 is fed by a separating roller 20 (if more than one original, it is separated from the remaining originals) and a pair of feeding rollers 21 through an original reading portion and discharged through an original discharge slot 24. The original reading portion is shown in detail in FIGS. 3 and 4, and 6.

Figure 3:
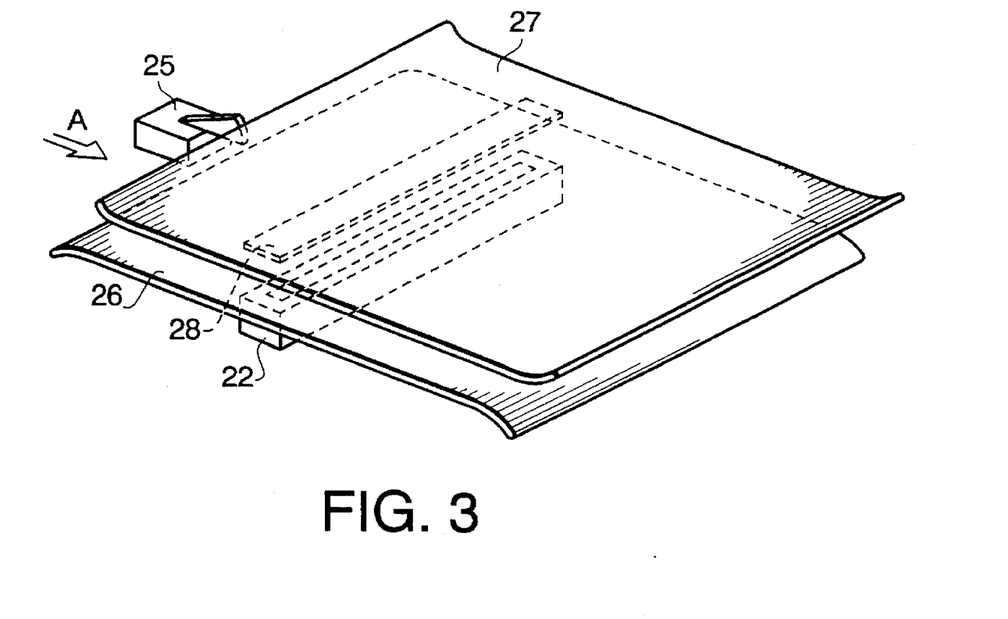
FIG. 3 is a perspective view of an original reading portion of the facsimile device of FIG. 1.

As shown in FIG. 3, the original 17 is fed between an upper guide plate 27 and a lower guide plate 26 in the original reading portion to a CCD scanner 22. The CCD scanner 22 is provided to the lower guide plate 26. The lower guide plate 26 has an opening (elongated in the direction of original width) through which a detecting surface of the CCD scanner 22 can face the upper guide plate 27.

Figure 6A:
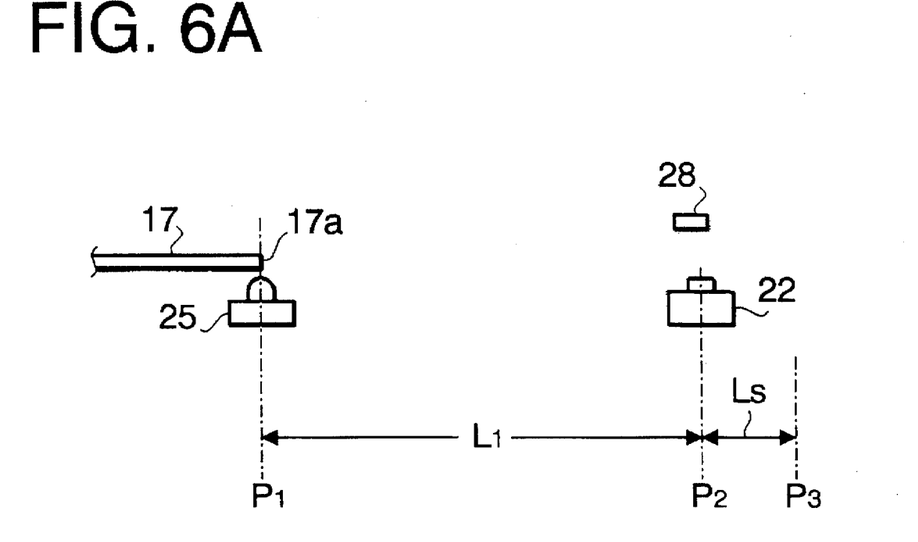
FIGS. 6A and 6B are schematics showing positions of a dummy original relative to the elements of the image reading device.

The original reading portion includes an original detecting sensor 25 provided upstream of the CCD scanner 22 for reading an image. The original detecting sensor 25 can be a contact type sensor, such as a micro limit switch, or a non-contact type sensor, such as a photosensor. The original detecting sensor 25 is provided upstream of the CCD scanner 22 by a distance $L_1$ (as shown in FIG. 6A).

Figure 4:
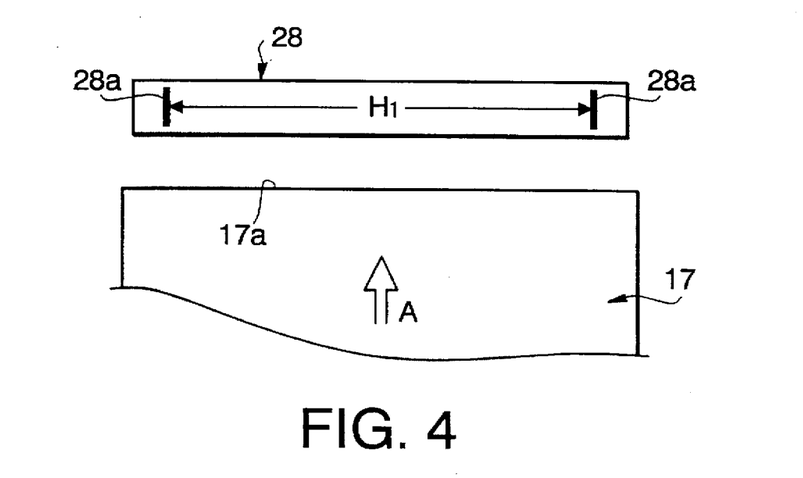
FIG. 4 is a schematic bottom view of a white level reference member of the original reading portion of FIG. 3.

A white level reference member 28 having the same length as the detecting surface of the CCD scanner 22 is attached to the guide plate 27. As shown in FIG. 4, a pair of black lines 28a, 28a are formed having an interval H1 in the width direction of the original 17 (i.e., the scanning direction of the CCD 22). The interval H1 is provided for setting the reading range of the original in the direction of the original width. That is, a CPU 30 (described later) sets the center position of the reading range according to the center position of the black lines 28a, 28a as read by the CCD 22.

Figure 5:
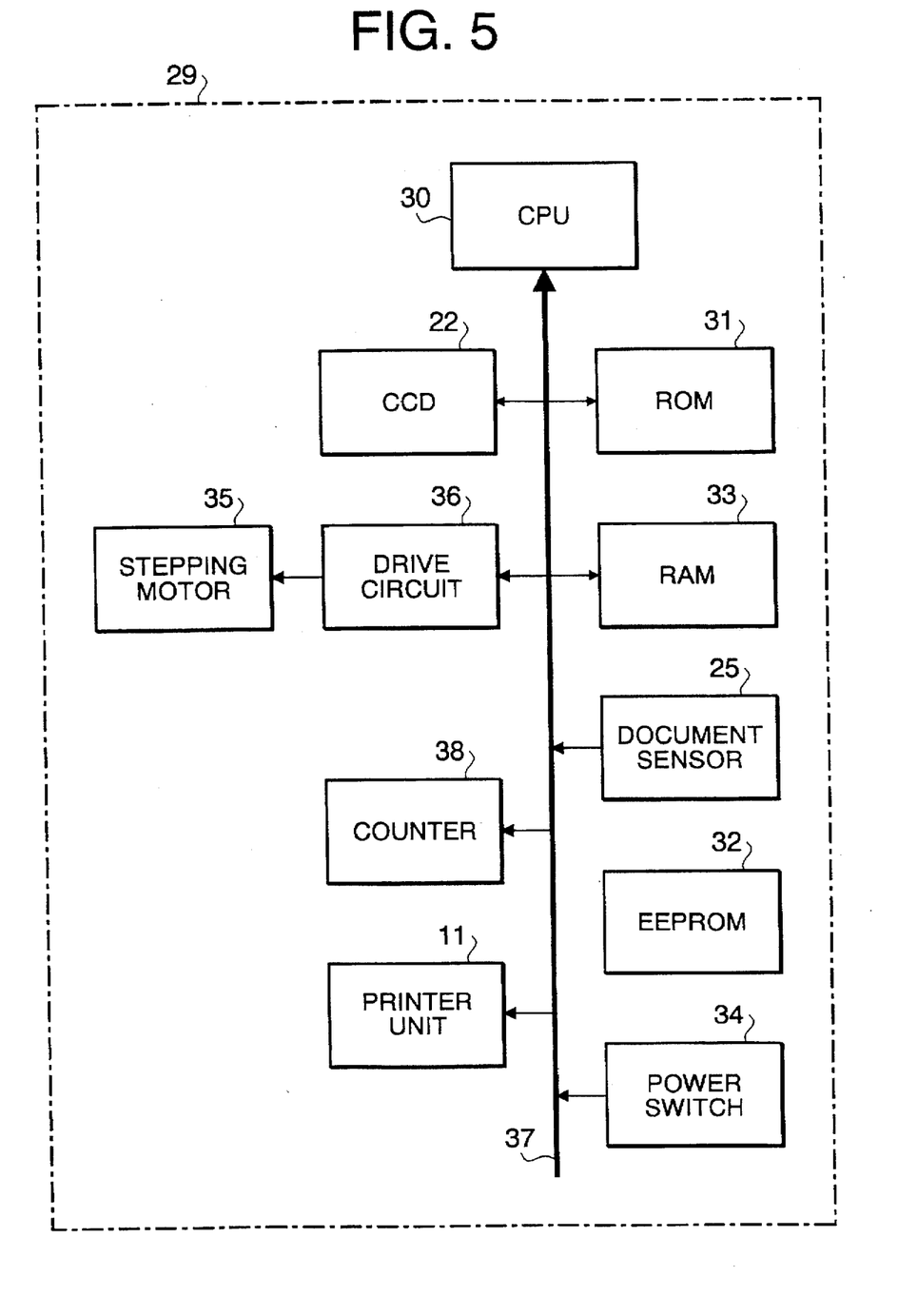
FIG. 5 is a block diagram of a control system of the image reading device.

FIG. 5 is a block diagram showing a control system 29 of the facsimile device. A CPU 30 is connected (via a bus 37) to a power switch 34, a ROM 31 storing a control program, a readable and writable non-volatile memory (EEPROM) 32, a RAM 33, the CCD scanner 22, the original detecting sensor 25, the printing unit 11, a counter 38, and a driving circuit 36 for driving a stepping motor 35 which drives the feeding rollers 21. The counter 38 is used for counting drive pulses of the stepping motor 35.

The EEPROM 32 has a quick-dial number storing area, an originator's number storing area, a communication condition storing area, and a function storing area (including communication mode, program and function data). The RAM 33 has a communication managing information storing area for storing communication information such as the date and time of a communication.

The CPU 30 is also connected by the bus 37 (via unillustrated connections) to the operation panel 42 for entering data such a facsimile number, the LCD display 42a of the operation panel 42, and the handset 4. The CPU is further connected to unillustrated elements well known in the art: a network control unit (NCU) for controlling a network via an external telephone exchange, a modem, a buffer memory for temporarily storing the coded image data, a coding circuit for coding the image data to be transmitted, a decoding circuit for decoding the image data received, and an image memory for storing the received data, a clock circuit for a calendar function such as date and time, and a character generating portion for displaying characters on the LCD display 42a and for generating characters according to the character code for printing by the printing unit 11.

Figure 7:
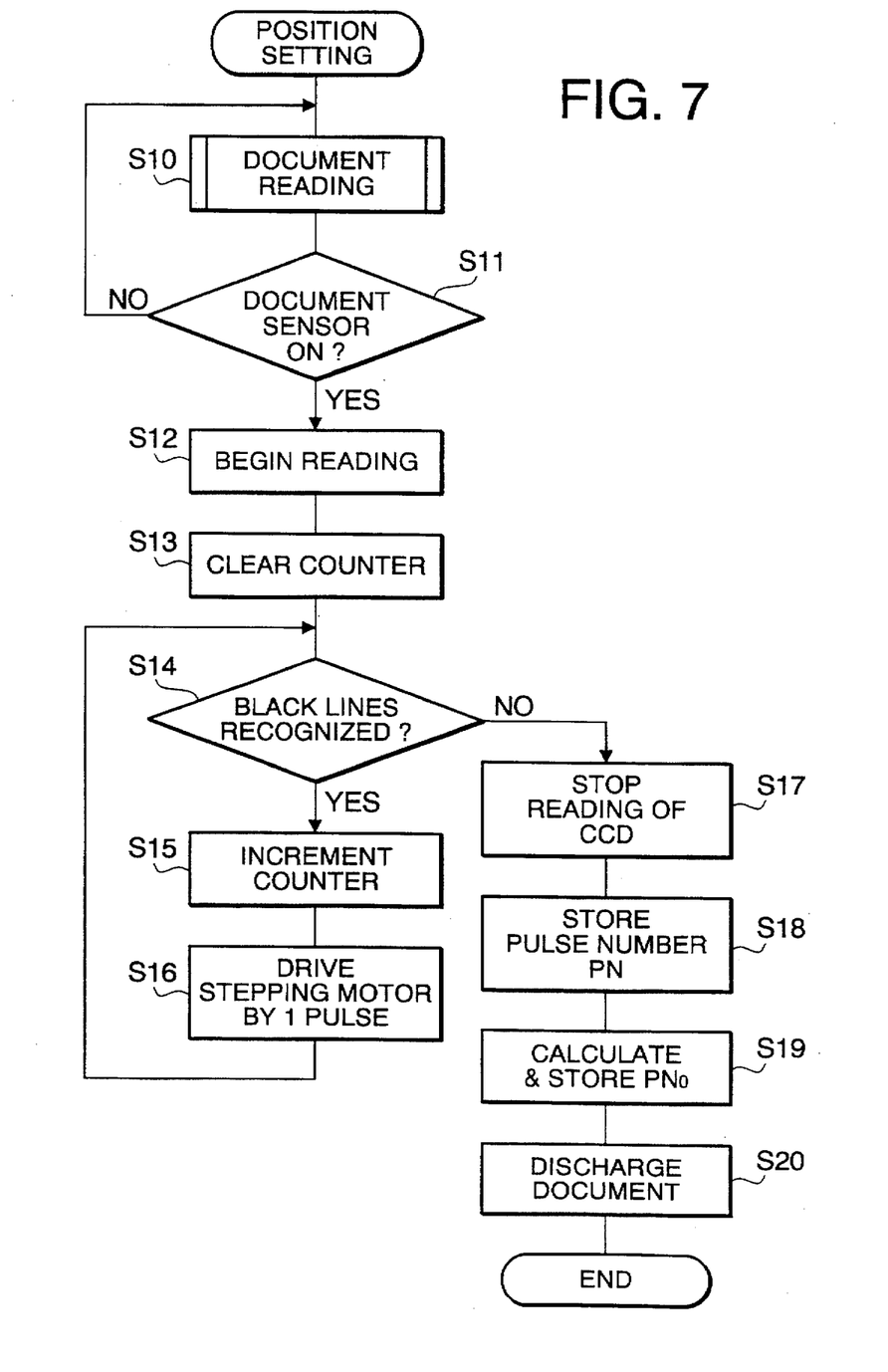
FIG. 7 is a flow chart showing an operation for setting the starting position for reading an original.

An operation for setting the starting position for reading an original is shown in the flowchart of FIG. 7. This operation is executed at the factory, for setting the correct reading starting position of the CCD 22 with respect to the feeding of originals. Preceding the operation of FIG. 7, the starting position setting operation has been set (for example, via the operation panel 42), and a dummy original 17' has been inserted into the original holder 18, whereupon the separating roller 20 feeds the dummy original 17' to the feeding rollers 21. The dummy original 17' has a width larger than the interval H1 between the black lines 28a, 28a (as shown in FIG. 4).

As shown in FIG. 7, when the starting position setting of FIG. 7 is initiated, at step S10, the stepping motor 35 is turned on and the feeding rollers 21 are driven for feeding the original 17.

Next in step S11, the process whether the original detecting sensor 25 detects the leading end 17a of the dummy original 17'. The process loops through steps S10 and S11 (N at step S11) until the leading end 17a of the dummy original 17' is detected. When the original detecting sensor 25 detects the leading end 17a (Y at step S11) as shown in FIG. 6A, the CCD scanner 22 is driven and starts scanning in step S12, sending the scan results to the CPU 30, and the counter 38 is cleared in step S13.

Figure 6B:
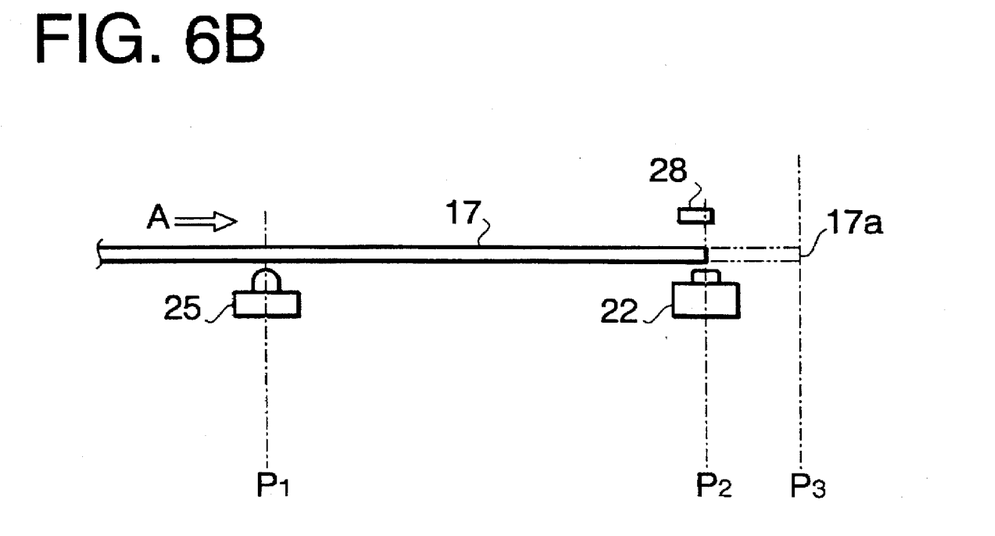

The CPU 30 then checks the results of the CCD 22 scanning for the black lines 28a, 28a on the white level reference member 28 in step S14. If the CPU 30 recognizes the black lines 28a, 28a (Y at step S14), then the counter 38 is incremented in step S15, the stepping motor 35 is driven by one pulse in step S16, and the process returns to step S14. The driving of the stepping motor 35 turns the feeding rollers 21 and advances the dummy original 17' by a known amount. The process loops through steps S14, S15, and S16, incrementing the counter 38 with each step of the stepping motor 35, until the CPU 30 does not recognize the black lines 28a, 28a in the image data from the CCD 22. That is, the CPU 30 does not recognize the black lines 28a, 28a, when the black lines 28a, 28a are hidden by the original 17 so that the CCD scanner 22 can not detect the black lines 28a, 28a as shown in FIG. 6B.

When the CPU 30 does not recognize the black lines 28a, 28a in the image data from the CCD 22 (N at step S14), the reading of the CCD scanner 22 is terminated as step S17, and the number in the counter 38 is stored as a counted pulse number (PN) in the EEPROM 32 at step S18. The process then proceeds to step S19.

The relationship between the distance $L_1$ from the original detecting sensor 25 to the CCD 22 and the counted pulse number PN is:

d×PN=$L_1$, where 'd' is a feeding amount of the dummy original 17' (or any original) by 1 pulse of the stepping motor 35. As shown in FIGS. 6A and 6B, in order to set the feeding distance for an original to be fed by the correct distance from the original detecting sensor 25 before the CCD 22 begins reading the image data, the distance from position $P_S$ of the original detecting sensor 25 to the position $P_2$ of the CCD 22 must be added to a predetermined length $L_S$ of non-printing area. Generally, a narrow space from the leading end 17a of the original 17 is set as the length $L_S$ of the non-printing area. A position $P_3$ is separated from the position of the CCD 22 in the feeding direction by the non-printing length $L_S$. Accordingly, the device 1 must be set to feed an original from the position $P_1$ to the position $P_3$ where the CCD 22 begins scanning the image on the original.

Therefore, in step S19, the CPU 30 calculates a feeding setup pulse number PNo for feeding the leading end 17a of the original 17 from the position $P_1$ to the position $P_3$ according to a relationship:

PNo=PN+Ls/d, and the feeding setup pulse number PNo is stored in the EEPROM 32. In this embodiment, $L_S$=3 mm and d=1/15.4 mm (that is, approximately 0.065 mm). Subsequently, in step S20, the dummy original 17' is discharged.

Accordingly, when an original to be read is loaded into the device 1, the CPU 30 controls the CCD scanner 22 to begin reading the original when the stepping motor 35 counts a number of pulses corresponding to the feeding setup pulse number PNo, after the original detecting sensor 25 detects the leading end of the original.

In this manner, even in the presence of the variation in the sensitivity of the original detecting sensor 25, mounting error of the original detecting sensor 25, or mounting error of the white level reference member 28, every facsimile device 1 has a correct and consistent starting position for reading an original, since the counted pulse number PN is detected and determined individually. The device 1 prevents faulty reading of the top portion of the original is prevented.

Furthermore, since the starting position for reading an original, after the original detecting sensor 25 detects the front end 17a, is set to be no less than the pulse number PNo, including the non-printing area $L_S$, the driving speed of the stepping motor 35 can be faster in this range, improving the overall speed.

Alternatively, the operation for detecting and calculating the starting position for reading an original can be performed by a user instead of at the factory. This operation is executed when the user has selected a function of the device 1 for setting the correct reading starting position of the CCD 22 with respect to the feeding of originals 17. Preceding the operation of FIG. 7, the user has set the starting position setting operation via the operation panel 42, has inserted a dummy original 17' (which may be any sheet of paper of the appropriate size) into the original holder 18, whereupon the separating roller 20 feeds the dummy original 17' to the feeding rollers 21. By performing the same operation as FIG. 7, the counted pulse number PN is detected and the feeding setup pulse number PNo is calculated. However, in such a case, the feeding setup pulse number is stored in the RAM 33, and the data stored in the RAM 33 is maintained by a back-up power source when the power is off.

Further alternatively, instead of detecting the feeding amount by counting pulses of stepping motor, a timer is provided that times the duration of feeding between the position $P_1$ and the position $P_3$. In this case, an additional sensor such as a photo sensor or a limit switch is provided at the position $P_3$ in FIGS. 6A and 6B.

The present disclosure relates to subject matter contained in Japanese Patent Application No. HEI 07-135111, filed on Jun. 1, 1995, which is expressly incorporated herein by reference in its entirety.

What is claimed is:

1. An image reading device, comprising:
   an original feeder for feeding an original along a feeding path;
   an image sensor for reading images from the original, said image sensor being downstream along said feeding path of said original feeder;
   a white level reference member, facing said image sensor from across said feeding path;
   at least one marking formed on said white level reference member facing said image sensor;
   an original sensor provided between said original feeder and said image sensor along said feeding direction;
   a first memory for recording a feeding amount as the original is fed by said original feeder along said feeding path, after said original sensor detects said original and until said at least one marking is obscured by the original;
   control means for setting a starting position of said original along said feeding path for said image sensor to begin reading said images, according to said recorded feeding amount.

2. The image reading device according to claim 1, wherein said starting position corresponds to a feeding distance from said original sensor to said image sensor.

3. The image reading device according to claim 1, wherein said starting position corresponds to a summation of a feeding distance from said original sensor to said image sensor and a non-printing area of the original.

4. The image reading device according to claim 1, wherein said white level reference member is read by said image sensor to determine a white level threshold of said image sensor.

5. The image reading device according to claim 1, further comprising:
   a second memory for retaining said starting position.

6. The image reading device according to claim 5, wherein said second memory is a non-volatile memory that retains said starting position when no power is supplied to said image reading device.

7. The image reading device according to claim 1, said original feeder comprising a stepping motor for driving said original feeder, and said image reading device further comprising:

means for counting pulses of said stepping motor as the original is fed by said original feeder along said feeding path, after said original sensor detects said original and until said at least one marking is obscured by the original.

8. The image reading device according to claim 1, wherein said at least one marking is a pair of markings separated by a predetermined distance, and wherein said control means sets a center and width of said reading range of said image sensor according to said pair of markings.

9. An image reading device, comprising:

an original feeder for feeding an original along a feeding path;

a lower guide plate having an opening formed therein;

an upper member across said feeding path from said lower guide plate;

a line image sensor for reading images from the original, said line image sensor being downstream along said feeding path of said original feeder and attached to said lower guide plate, and said line image sensor positioned to read images through said opening;

a white level reference member attached to said upper member in a position readable by said line image sensor and facing said image sensor from across said feeding path;

a pair of markings on said white level reference member in a position readable by said line image sensor, said pair of markings being separated from each other by a predetermined distance;

an original sensor provided between said original feeder and said line image sensor along said feeding path;

a first memory for recording a feeding amount as the original is fed by said original feeder along said feeding path, after original sensor detects said original and until said pair of markings are obscured by the original;

a controller including:

means for setting a reading range of said line image sensor in response to said line image sensor reading said predetermined distance from said pair of markings; and means for setting a white level threshold of said image sensor in response to said line image sensor reading said white level reference member; and means for setting a starting position of said original along said feeding path for said line image sensor to begin reading said images, based on said recorded feeding amount.

10. The image reading device according to claim 9, wherein said white level reference member defines a white level threshold of said line image sensor when said line image sensor reads said white level reference member.

* * * * *